United States Patent

Kawata et al.

[11] Patent Number: 5,990,665
[45] Date of Patent: Nov. 23, 1999

[54] POWER CIRCUIT

[75] Inventors: Kaoru Kawata; Minoru Nakamura, both of Tokyo, Japan

[73] Assignee: Mitsubishi Denki Kabushiki Kaisha, Tokyo, Japan

[21] Appl. No.: 09/047,387

[22] Filed: Mar. 25, 1998

[30] Foreign Application Priority Data

Mar. 28, 1997 [JP] Japan .................................... 9-077378

[51] Int. Cl.⁶ ...................................................... H02J 7/10
[52] U.S. Cl. ............................................ 320/162; 320/164
[58] Field of Search .................................... 320/121, 125, 320/138, 160, 162, 163, 164

[56] References Cited

U.S. PATENT DOCUMENTS 3,919,618  11/1975  Coleman et al. ........................ 320/146
4,031,450  6/1977   Hammel et al. ......................... 320/153
5,576,612  11/1996  Garrett et al. .......................... 320/106

*Primary Examiner*—Peter S. Wong
*Assistant Examiner*—Gregory Toatley, Jr.
*Attorney, Agent, or Firm*—Leydig, Voit & Mayer, Ltd.

[57] ABSTRACT

A power circuit for a device having a secondary battery receives commercial electric power supplied externally and supplies electric power to a target in the device and to the secondary battery. The power circuit includes a measuring circuit and a current control circuit. The measuring circuit measures power consumption of the target circuit in the device. The current control circuit controls a charging current to the secondary battery so that the power consumption and the charging current have a negative correlation based on a measurement result of the measuring circuit.

7 Claims, 9 Drawing Sheets

Patiall Enlargement

POWER CIRCUIT

BACKGROUND OF THE INVENTION

The present invention relates to a power circuit for use in a device which can be operated by a secondary battery, such as. a portable device of a notebook type personal computer or the like.

A device which can be operated by a secondary battery, such as a portable device of a notebook type personal computer or the like, is normally provided with a power circuit which receives a commercial electric power via an AC adapter and supplies electric power for charging the secondary battery and driving the device.

FIG. 9 is a block diagram schematically showing the construction of a notebook type personal computer (referred to as a "notebook computer" hereinafter) which is an example of the prior art devices having such a charging function. When externally supplying the commercial electric power to this notebook computer 100, the notebook computer 100 is connected to an AC power line of a commercial power of 100 V via an AC adapter 90. The notebook computer 100 is constructed of a power circuit section having a charging circuit 104, a battery pack 106 and a selecting circuit 108 and a system section 110.

In the above-mentioned construction, a DC voltage outputted from the AC adapter 90 is supplied to the charging circuit 104 and the selecting circuit 108. The charging circuit 104 is a circuit for supplying a charging current to the battery pack 106, and charging is executed with a voltage of 8.4 V (note that the maximum current is not greater than 1.5 A) taking the characteristics of the secondary battery used in the battery pack 106 and so on into consideration. The selecting circuit 108 is connected to the AC adapter 90 and the battery pack 106 and operates to select between the AC adapter 90 and the battery pack 106 for supplying a power to the system section 110. This selecting circuit 108 is constructed of so-called the "matched diodes" D1 and D2 as shown in FIG. 10, and a voltage supplied from the AC adapter 90 is set so as to be greater than the voltage supplied from the battery pack. Therefore, when the AC adapter 90 is connected to the notebook computer 100 in order to supply commercial electric power to it, the commercial electric power is supplied to the system section 110. When the AC adapter 90 is not connected, electric power is supplied from the battery pack 106 to the system section 110. The system section 110 has a main board 114 for putting the original functions of the notebook computer into effect as well as a DC-to-DC (DC/DC) converter 112 for generating a power voltage necessary for the main board 114 from the voltage supplied from the selecting circuit 108.

For the purpose of concurrently supplying an electric power from the AC adapter 90 to the charging circuit 104 and the system section 110 in the above-mentioned construction, it is necessary to make the capacity of the AC adapter 90 greater than the sum of the maximum values of the powers required by the sections of the notebook computer. In the above-mentioned prior art case, since the maximum electric power required by the charging.circuit 104 is 8.4 V×1.5 A=12.6 W and the maximum electric power required by the system section 110 is 12 W, there is required a capacity of 12.6 W+12 W=24.6 W, consequently needing a large-size AC adapter. On the other hand, a compact portable device having a charging function has a limited size and capacity of a cooling mechanism provided inside its casing, and therefore, the calorific value is required to be suppressed. However, when executing charging during the operation of the system by concurrently supplying a power to the charging circuit 104 and the system section 110, the calorific value increases, and this requires an increase in size of the cooling mechanism. Therefore, in a device of the current notebook computer or the like having a charging function, there is a normal practice of executing no charging in the operating state of the system, and the operation of the system section 110 is stopped when charging the secondary battery in the battery pack 106.

SUMMARY OF THE INVENTION

Accordingly, it is an object of the present invention to provide a power circuit capable of charging a device during the operation of the device without causing an increase in size of the AC adapter or the cooling mechanism.

According to a first aspect of the invention we provide a power circuit which belongs to a device having a secondary battery, receives a commercial electric power supplied externally and supplies an electric power to an objective circuit in the device and to the secondary battery; said power circuit comprising:

a charging circuit which receives the commercial electric power supplied externally and operates as a constant voltage source having a current limiting function;

a resistor connected in series with said secondary battery;

a power supply line for connecting a circuit constructed of said secondary battery and said resistor in parallel with said objective circuit in the device to supply a power from said charging circuit to said secondary battery, said resistor and said objective circuit;

a comparator for comparing a voltage of said secondary battery with a predetermined voltage; and a switch which is opened when the voltage of said secondary battery is not higher than a specified value and is closed when the voltage of said secondary battery is higher than the specified value based on a comparison result produced by said comparator.

With the above power circuit according to the first aspect of the invention, the current supplied from the charging circuit is suppressed to a value not greater than a specified value by the current limiting function of the charging circuit, and a resistor is inserted in series with the secondary battery in the initial stage of charging when the apparent internal resistance of the secondary battery is low (when the terminal voltage is low), thereby securing a supplied current necessary for the operation of the device. With this arrangement, the secondary battery can be charged in a state in which the device is operated while suppressing the total power externally supplied to the device to a value not greater than a specified value, thereby allowing the charging to be achieved during the operation of the device while suppressing the increase in size of the AC adapter and the cooling mechanism. Furthermore, according to this power circuit, no selecting circuit is necessary and no matched diode used. Accordingly, there is no power loss due to the selecting circuit and consequently the use efficiency of the secondary battery is improved than in the prior art.

According to a second aspect of the invention we provide a power circuit which belongs to a device having a secondary battery, receives a commercial electric power supplied externally and supplies an electric power to an objective circuit in the device and to the secondary battery; said power circuit comprising:

a charging circuit which receives the commercial electric power supplied externally and operates as a constant voltage source having a current limiting function;

a resistor connected in series with said secondary battery;

a power supply line for connecting a circuit constructed of said secondary battery and said resistor in parallel with said objective circuit in the device to supply a power from said charging circuit to said secondary battery, said resistor and said objective circuit;

a detecting circuit for detecting the voltage of said secondary battery; and a resistance control circuit for varying a value of said resistor so that the voltage of said secondary battery and the value of said resistor have a negative correlation based on a detection result of the detecting circuit.

With the above power circuit according to the second aspect of the invention, the current supplied from the charging circuit is suppressed to a value not greater than a specified value by the current limiting function of the charging circuit, and the value of the resistor inserted in series with the secondary battery reduces as the terminal voltage of the secondary battery increases. Therefore, the reduction in charging speed due to the insertion of the resistor can be suppressed while securing the advantage of the aforementioned power circuit according to the first aspect of the invention, thereby allowing the charging period to be reduced further than in the aforementioned power circuit.

According to a third aspect of the invention we provide a power circuit which belongs to a device having a secondary battery, receives a commercial electric power supplied externally and supplies an electric power to an objective circuit in the device and to the secondary battery; said power circuit comprising:

a measuring circuit for measuring a power consumption at said objective circuit in the device; and a current control circuit for controlling a charging current to said secondary battery so that said power consumption and said charging current have a negative correlation based on a measurement result of said measuring circuit.

With the above power circuit according to the third aspect of the invention, the charging current from the external commercial electric power to the secondary battery has a negative correlation with the power consumption at the objective circuit which is provided in the device and to which a power is supplied. That is, the charging current reduces as the power consumption at the objective circuit to which the power is supplied increases, and the charging current increases as the power consumption reduces. Therefore, the total power externally supplied to the device, i.e., the total power consumption is allowed to have a sufficiently reduced value smaller than the sum of the maximum power for operating the device and the maximum power required by the secondary battery without imposing any limitation on the operation of the device nor unnecessarily prolonging the charging time. As a result, charging during the operation of the device can be achieved without causing an increase in size of the AC adapter and the cooling mechanism.

Other features and advantages of the present invention will become apparent from the following description of embodiments of the invention which refers to the accompanying drawings.

DETAILED DESCRIPTION OF THE PREFERRED EMBODIMENTS

First Embodiment

Figure 1:
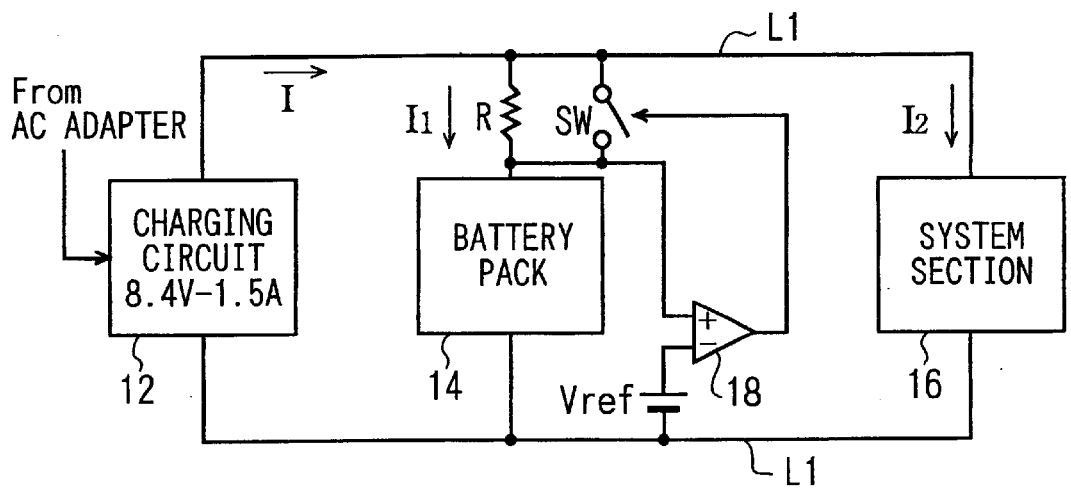
FIG. 1 is a circuit diagram showing the construction of a notebook type personal computer provided with a power circuit according to a first embodiment of the present invention.
Figure 9:
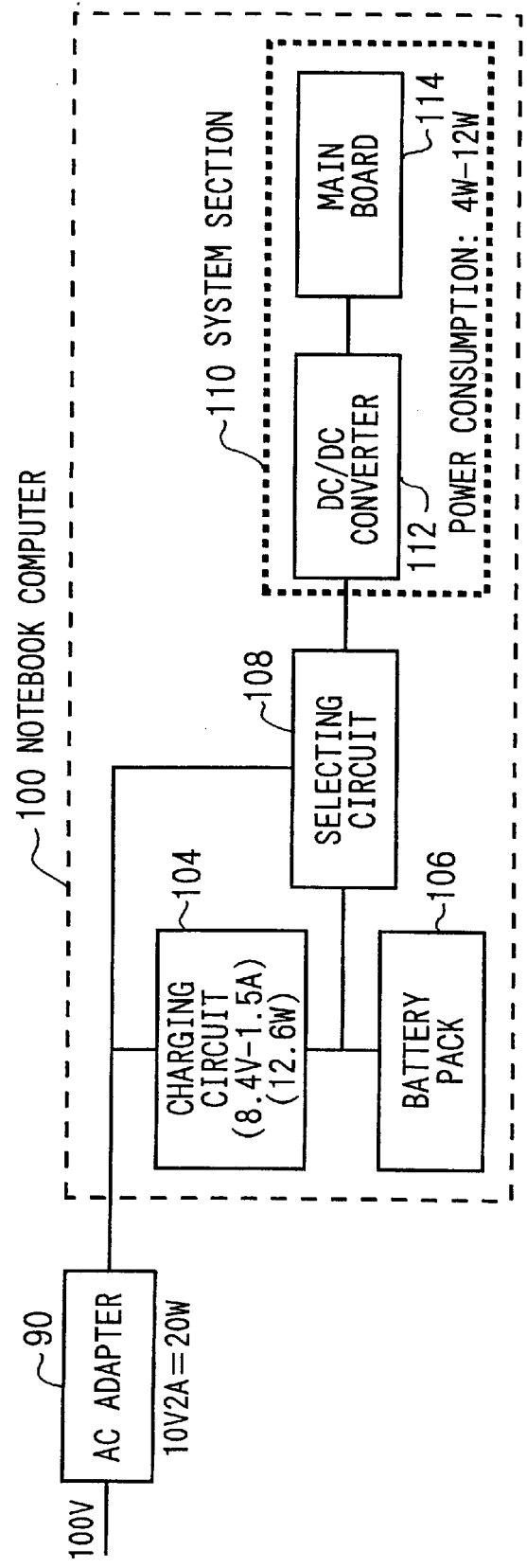
FIG. 9 is a functional block diagram showing the construction of a notebook computer provided with a prior art power circuit.

FIG. 1 is a circuit diagram showing the construction of a notebook computer provided with a power circuit according to a first embodiment of the present invention. This notebook computer is constructed of a power circuit section having a charging circuit 12, a battery pack 14, a reference voltage source Vref, a comparator 18, a resistor R and a switch SW and a system section 16 serving as an objective circuit to which a power is supplied, having a DC/DC converter and a main board (the internal construction of the system section 16 is similar to that of the prior art shown in FIG. 9). The system section 16 can be operated by a secondary battery provided inside the battery pack 14, and it is allowed to charge the secondary battery and drive the system section 16 with commercial power externally supplied via an AC adapter 90.

Figure 2A:
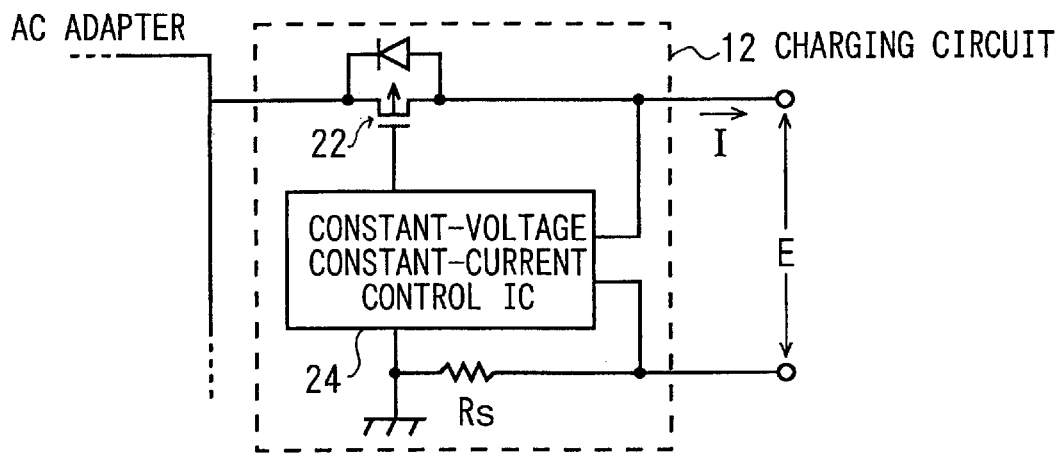
FIG. 2A is a circuit diagram showing the construction of a charging circuit of the first embodiment.

The charging circuit 12 in the above-mentioned power circuit section is a constant voltage source having a current limiting function, and according to the present embodiment, it functions as a constant voltage source of 8.4 V in a range in which the current it supplies does not exceed 1.5 A. When a current exceeding 1.5 A flows on the assumption that the output voltage is 8.4 V, then the power circuit section functions as a constant current source of 1.5 A as a consequence of the operation of its current limiting function. Such a charging circuit 12 can be implemented with, for example, a construction as shown in FIG. 2A. The example shown in FIG. 2A is constructed of a constant-voltage constant-current power control IC (Integrated Circuit) 24, a P-type MOSFET (provided with a body diode) 22 and a current detecting resistor Rs. As the constant-voltage constant-current power control IC 24, for example, an IC of a model number MM1332E available from MITSUMI ELECTRIC CO., LTD. can be used. This IC 24 is preset with a voltage of 8.4 V as a value of a voltage E to be outputted, and by controlling the voltage to be applied to the gate of the MOSFET 22, the voltage (e.g., a voltage of 15 V) outputted from the AC adapter is dropped to E=8.4 V. This IC 24 also detects the magnitude of a current I to be supplied by means of a resistor Rs, thereby executing control so that the current I to be supplied does not exceed 1.5 A (implementation of the current limiting function).

Figure 2B:
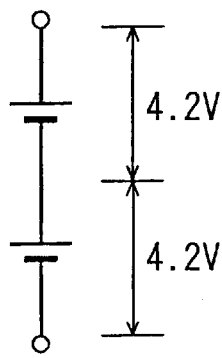
FIG. 2B is a diagram showing the connection state of a secondary battery inside a battery pack.

As a cell constituting the battery pack 14, a lithium Ion battery which serves as the secondary battery is used. The charging current of the lithium ion battery guaranteed by the cell manufacturer is 1.5 A maximum, and the limitation value of the current of the charging circuit 12 is based on this current. Although the cell terminal voltage in charging the lithium ion battery is designated to be 4.2 V by the cell manufacturer, it is desirable to make the voltage supplied to the system section 16 higher than the power supply voltage required for the main board for the efficiency of the DC/DC converter inside the system section 16. Accordingly, there is a practice of using the lithium ion battery inside the battery pack 14 with two cells connected in series with each other as shown in FIG. 2B, and an output voltage (output voltage when the output current does not exceed 1.5 A) from the charging circuit 12 is set to 4.2 V×2=8.4V.

A resistor R is connected in series with the battery pack 14, and power is supplied from the charging circuit 12 to the circuit comprised of this resistor R and the battery pack 14 via a power supply line L1. The resistor R is connected in parallel with a switch SW, and the opening and closing of the switch SW is controlled by a cell terminal voltage detecting means including the comparator 18 and the reference voltage source Vref. That is, the switch SW is opened when the voltage across both the terminals of the battery pack 14 is greater than Vref, and the switch SW is closed when the voltage is smaller than Vref. With this arrangement, when the apparent internal resistance of the cell (lithium ion battery) in the initial stage of charging is small, the switch SW is opened to provide a state in which the resistor R is connected in series with the battery pack 14. When the charging progresses and the apparent internal resistance of the cell becomes greater than a specified value, the switch SW is closed to substantially cancel the insertion of the resistor R. It is to be noted that the expression of "apparent internal resistance" means a value obtained by dividing the voltage applied to the cell by the current flowing through the cell.

The system section 16 is connected in parallel with the circuit comprised of the battery pack 14 and the resistor R by the power supply line L1. When the AC adapter is not connected to the notebook computer and no power is supplied from the charging circuit 12, power is supplied from the battery pack 14 to the system section 16 via the power supply line L1. In this case, since the total charge quantity of the battery pack 14 is greater than a specified value in general, the apparent internal resistance is great and the switch SW is closed. When the AC adapter is connected, power is supplied from the charging circuit 12 to the system section 16 via the power supply line L1.

The operation of the power circuit section having the aforementioned construction when the AC adapter is connected will be described in detail below.

Figure 3:
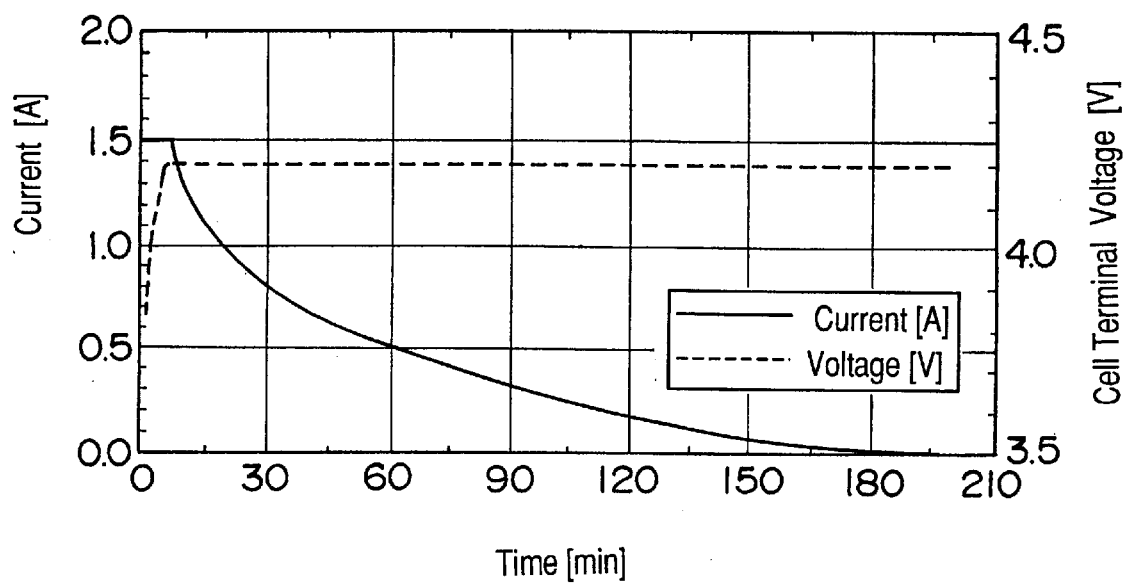
FIG. 3 is a graph showing the charging characteristic of a lithium ion battery which is the secondary battery used in the first embodiment.
Figure 4A:
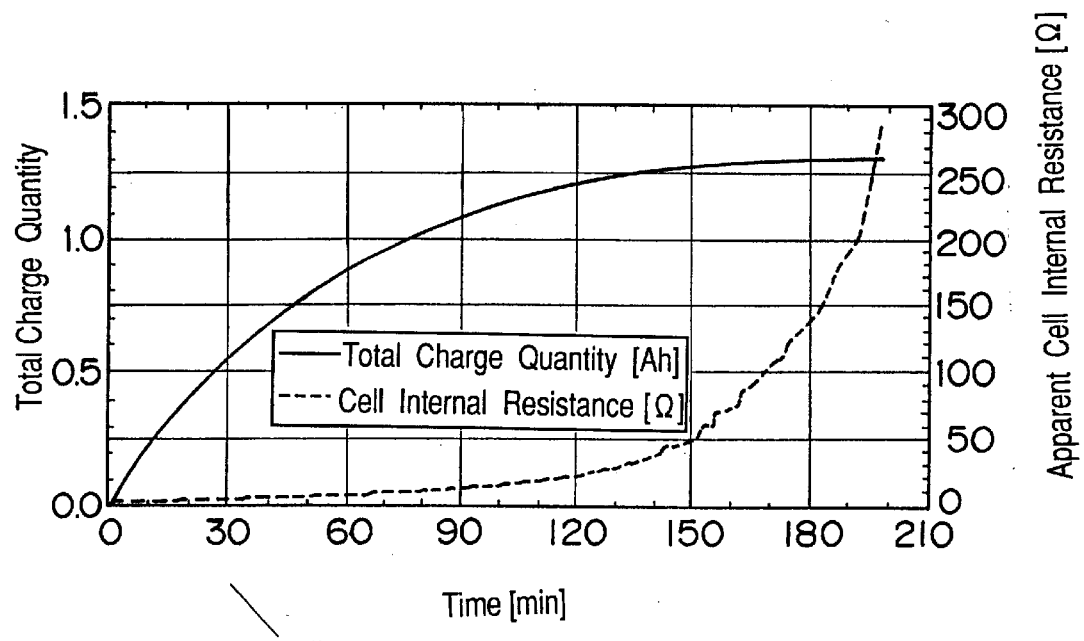
FIGS. 4A and 4B are graphs showing the apparent internal resistance of the lithium ion battery which is the secondary battery used in the first embodiment together with the total charge quantity.
Figure 4B:
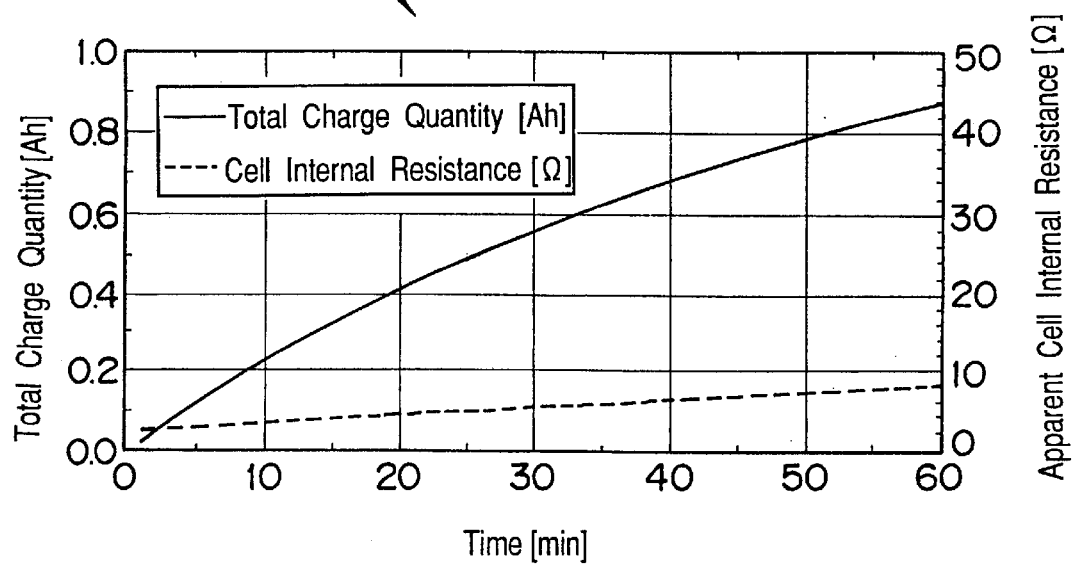

FIG. 3 and FIGS. 4A and 4B are graphs showing the charging characteristic per cell (of lithium ion battery) inside the battery pack 14. As shown in FIGS. 4A and 4B, the lithium ion battery has a very small apparent cell internal resistance (about 2.5 Ω) in the initial stage of charging, namely in a state in which the total charge quantity is small, and the apparent cell internal resistance steeply increases as the total charge quantity increases as a consequence of the progress of charging. Therefore, the charging is executed by the charging circuit 12 which serves as the constant voltage source having the current limiting function, the cell terminal voltage is lower than 4.2 V (=8.4/2) in the initial stage and the charging current supplied to the cell becomes constant at 1.5 A as shown in FIG. 3. Subsequently, the internal resistance of the cell increases, and after the cell terminal voltage reaches 4.2 V, the constant voltage of 4.2 V continues to be applied to the cell and the charging current will gradually decrease as the charging progresses.

When the battery pack 14 and the system section 16 are directly connected in parallel with each other, since the internal resistance of the cell is extremely small as described above, in the initial stage of charging, insufficient current may be supplied to the system section 16, and this will possibly result in incorrect operation of the system section 16. However, according to the construction shown in FIG. 1, the switch SW is opened in the initial stage of charging to insert the resistor R in series with the battery pack 14, and therefore, the charging current to the cell is suppressed, consequently securing the supply of a specified current to the system section 16. In this case, the value of the resistor R is set so that at least a specified necessary minimum current for the start up of the system can be secured as a supply current to the system section 16.

When the charging progresses and the voltage across both the terminals of the battery pack 14 exceeds Vref as a consequence of the increase of the internal resistance of the cell, the comparator 18 detects this and closes the switch SW. By this operation, the resistor R inserted in series with the battery pack 14 is substantially short-circuited canceled. At this time, a constant voltage of 8.4 V can be supplied from the charging circuit 12 to the battery pack 14 and the system section 16. It is to be noted that, when a consumed current I2 at the system section 16 increases and the sum of a charging current I1 to the battery pack 14 and the consumed current I2 at the system section 16, i.e., the current I outputted from the charging circuit 12, exceeds 1.5 A, then the current limiting function of the charging circuit 12 fixes to fix the sum of the currents supplied to the battery pack 14 and the system section 16 to 1.5 A, so that the voltage supplied to both of them is not greater than 8.4 V.

Figure 5:
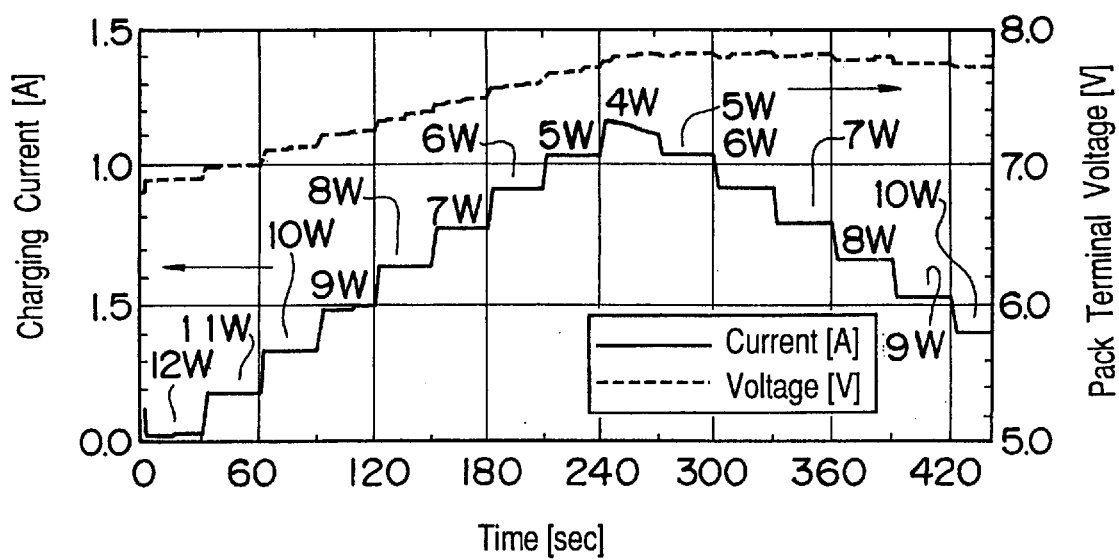
FIG. 5 is a graph showing a change in a charging current when the power consumption of a system section varies in a region in which the charging circuit of the first embodiment functions as a constant current source.

As described above, since the charging circuit 12 is a constant voltage source having a current limiting function, the constant voltage of 8.4 V is supplied to both the system section 16 and the battery pack 14 within the current limitation range (not greater than 1.5 A), thereby operating the computer and charging the secondary battery. When the charging current to the battery pack 14 is increased in the initial stage of charging or when the consumed current at the system section 16 increases, causing a state in excess of the current limitation range of the charging circuit 12, the charging circuit 12 operates as a constant current source, and the current I supplied from the charging circuit 12 is fixed at 1.5 A. In this region in which the charging circuit 12 functions as a constant current source, the charging current to the battery pack 14 decreases in correspondence with an increase in consumed current (power consumption) at the system section 16 (refer to FIG. 5). It is to be noted that the current necessary for the start up of the system section 16 is secured by inserting the resistor R in series with the battery pack 14 in the initial stage of charging.

According to the present embodiment, the battery pack 14 can be charged while operating the system section 16 as described above, when the current supplied from the charging circuit 12 does not exceed the specified value (1.5 A). Therefore, the power externally supplied via the AC adapter becomes not greater than a specified value, thereby charging the battery pack 14 during the operation of the system section 16 while suppressing an increase in the size of the AC adapter and the cooling mechanism of the notebook computer.

Figure 10:
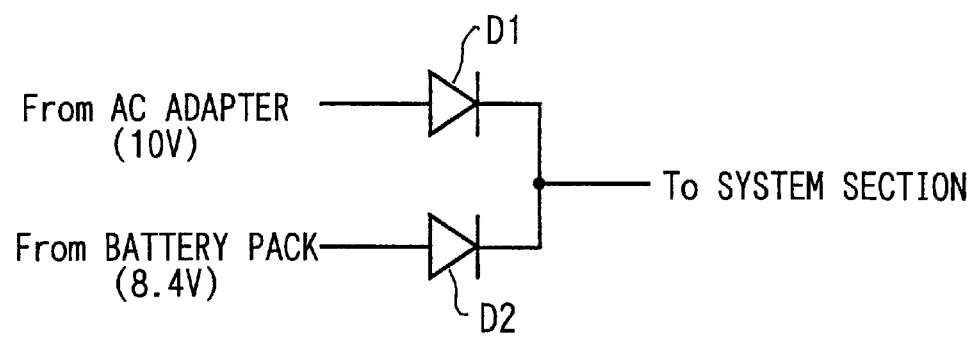
FIG. 10 is a circuit diagram showing the construction of a selecting circuit in the prior art power circuit.

According to the present embodiment, no selecting circuit is necessary and no matched diode used, in contrast to the prior art power circuit (refer to FIGS. 9 and 10), and providing an advantage that no power loss due to the selecting circuit occurs and therefore, the use efficiency of the battery pack improves.

Second Embodiment

In the aforementioned first embodiment, the resistor R is inserted in series with the battery pack 14 in the initial stage of charging when the internal resistance of the cell is extremely small (refer to FIG. 1), whereby at least the specified necessary minimum current for the start up of the system can be secured as a supply current to the system section 16. However, taking the convenience of the user into consideration, it is desirable to set the value of the resistor R so that the maximum consumed current at the system section 16 can be secured for the purpose of enabling charging during operation without imposing any limitation on the operation of the system section 16. However, when the value of the resistor R is increased, the charging speed of the battery pack 14 becomes slower, consequently requiring a long time for the charging. Accordingly, in order to avoid a reduction in the charging speed, the second embodiment of the present invention adopts a construction in which the value of the resistor R is varied according to the voltage (cell terminal voltage) across both the terminals of the battery pack. The second embodiment will be described below.

Figure 6:
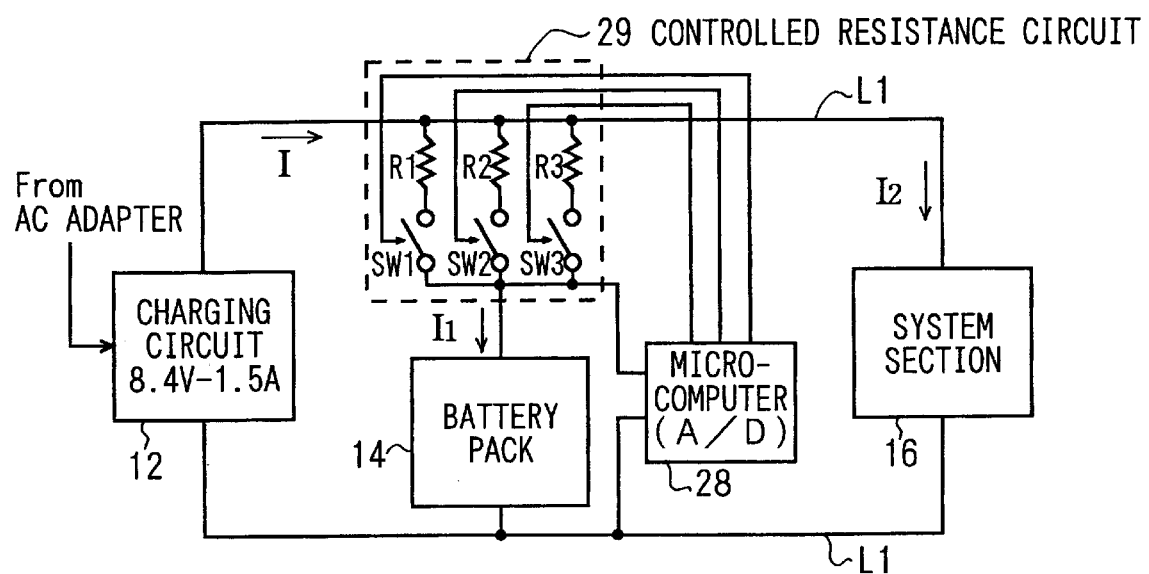
FIG. 6 is a circuit diagram showing the construction of a notebook type personal computer provided with a power circuit according to a second embodiment of the present invention.

FIG. 6 is a circuit diagram showing the construction of a notebook computer provided with a power circuit of the second embodiment. This notebook computer is provided with a system section 16 having the same construction as that of the first embodiment and includes the power circuit components of a charging circuit 12 which serves as a constant voltage source with a current limiting function and a battery pack 14 in which two lithium ion battery cells are connected in series with each other, similar to the first embodiment. However, this power circuit of the notebook computer differs from the first embodiment in that it is provided with a controlled resistance circuit 29 in which three series circuits obtained by connecting a resistor R1, a resistor R2 and a resistor R3 in series with a switch SW1, a switch SW2 and a switch SW3, respectively, are connected in parallel with one another, in place of the resistor R and the switch SW connected in parallel with it. In contrast to the arrangement of the first embodiment in which the cell terminal voltage detecting means is implemented by the comparator 18 and the reference voltage source Vref, the cell terminal voltage detecting means is implemented by a microcomputer 28 provided with a built-in analog-to-digital (A/D) converter in this power circuit of the notebook computer. The microcomputer 28 receives an input of a voltage across both the terminals of the battery pack 14 and generates a digital signal representing the voltage by means of the built-in A/D converter. Regarding this digital signal as a detection result of the cell terminal voltage (one half of the voltage across both the terminals of the battery pack 14 corresponds to the cell terminal voltage) and according to the detection result, the microcomputer 28 varies the resistance value of the controlled resistor circuit 29 (this value corresponds to the value of a resistor inserted in series with the battery pack 14 and will be referred to as an "inserted resistance value" hereinafter). That is, by controlling the opening and closing of the switches SW1 through SW3 according to the detection result of the cell terminal voltage based on a specified program stored in a built-in memory, the microcomputer 28 varies the inserted resistance value. In this case, the microcomputer 28 controls the opening and closing of the switches SW1 through SW3 so that the inserted resistance value increases as the detection value of the cell terminal voltage decrease and the inserted resistance value decreases as the cell terminal voltage increases. Therefore, assuming that R1>R2>R3, then only the switch SW1 is closed and the other switches SW2 and SW3 are opened in the initial stage of charging, and all the switches SW1 through SW3 are closed in a completely charged state (a state in which the total charge quantity reaches the maximum value). Although the controlled resistance circuit is constructed of the three resistors R1, R2 and R3 in the example shown in FIG. 6, the inserted resistance value can be controlled more finely by using more resistors and switches corresponding to them and increasing the number of bits of the A/D converter according to it.

With the above arrangement, since the apparent internal resistance of the cell is extremely small in the initial stage of charging, the apparent internal resistance is detected by the microcomputer 28 which serves as the cell terminal voltage detecting means, and the inserted resistance value is set to the maximum value by control of the switches SW1 through SW3. In this case, it is desirable to select the values of the resistors R1 through R3 so that a current necessary for normal operation can be supplied to the system section 16 even when the consumed current at the system section 16 is maximized. With the selection as described above, according to the present embodiment, when the charging progresses and the apparent internal resistance of the cell (cell terminal voltage) increases, the opening and closing of the switches SW1 through SW3 is controlled according to it even though the inserted resistance value increases in the initial stage of charging, by which the inserted resistance value gradually decreases. Therefore, different from the first embodiment, the reduction in speed of the charging of the battery pack 14 due to the insertion of the resistor is suppressed, so that the charging period is prevented from becoming longer.

As described above, according to the present embodiment, by varying the inserted resistance value in response to the cell terminal voltage, charging during operation can be achieved while allowing the full operation of the system section 16 at which the power consumption is maximized and suppressing a reduction in charging speed.

Third Embodiment

A power circuit according to a third embodiment of the present invention measures the power consumption at the system section and controls the charging current so that the charging current supplied to the battery pack decreases when the measurement result of the power consumption increases, i.e., so that the charging current to the battery pack and the power consumption at the system section have a negative correlation, so that charging during operation is achieved.

Figure 7:
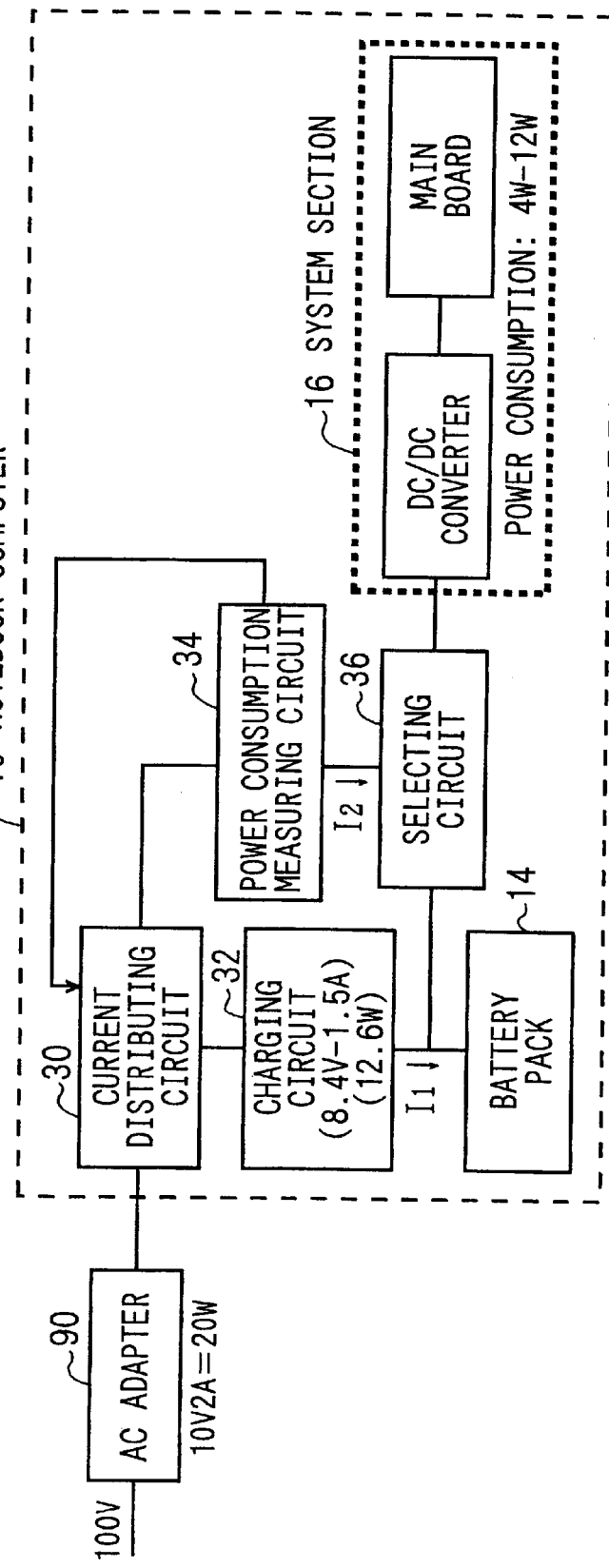
FIG. 7 is a functional block diagram showing the construction of a notebook computer provided with a power circuit according to a third embodiment of the present invention.

FIG. 7 is a functional block diagram schematically showing the construction of a notebook computer provided with a power circuit of the third embodiment as described above. This notebook computer 10 has a system section 16 and a battery pack 14 which have the same constructions as those of the aforementioned first and second embodiments and is provided with a current distributing circuit 30, a charging circuit 32, a power consumption measuring circuit 34 and a selecting circuit 36 which constitute a power circuit together with the battery pack 14. With this arrangement, the notebook computer 10 is able to operate the system section 16 on the secondary battery inside the battery pack 14, charge the secondary battery with commercial electric power externally supplied via the AC adapter 90 and operate the system section 16.

The power consumption measuring circuit 34 in the power circuit measures the power supplied to the system section 16 via the selecting circuit 36 from the commercial electric power externally supplied via the AC adapter 90, i.e., the power consumption at the system section 16. The current distributing circuit 30 controls current distribution to the charging circuit 32 based on the measurement result so that a charging current I1 supplied to the battery pack 14 has a negative correlation with the power consumption at the system section 16. As a concrete control method of this current distribution, there can be used, for example, a method of preparatorily setting the maximum value of the total power consumption of the notebook computer 10, comparing the maximum value of the total power consumption with the measurement result of the power consumption obtained at the power consumption measuring circuit 34 and controlling the current distribution to the charging circuit 32 so that a current corresponding to the difference of the power between them or a current smaller than it becomes the charging current. The charging circuit 32 charges the secondary battery inside the battery pack 14 under the control of the current distribution as described above. Taking the charging characteristic of the secondary battery (lithium ion battery) and the efficiency of the DC/DC converter inside the system section 16 into consideration, the charging circuit 32 is implemented as a constant voltage source provided with a current limiting function of a current limitation value of 1.5 A and an output voltage of 8.4 V.

According to the power circuit of the present embodiment as described above, in a case where the AC adapter 90 is connected and commercial electric power is externally supplied, when the power consumption at the system section 16 increases, the charging current supplied to the battery pack 14 decreases in response. When the power consumption at the system section 16 decreases, the charging current supplied to the battery pack 14 increases in response to it. With this arrangement, the total power externally supplied to the notebook computer 10, i.e., the total power consumption can be consistently suppressed to a value not greater than a specified value without imposing any limitation on the operation of the system section 16 nor unnecessarily prolonging the charging time. This specified value can be a value sufficiently smaller than the sum of the maximum powers required by the system section 16 and the charging circuit 32 by virtue of the control of the aforementioned current distribution, and consequently, the charging during the operation of the system section 16 can be achieved without causing an increase in size of the AC adapter 90 and the cooling mechanism.

Figure 8:
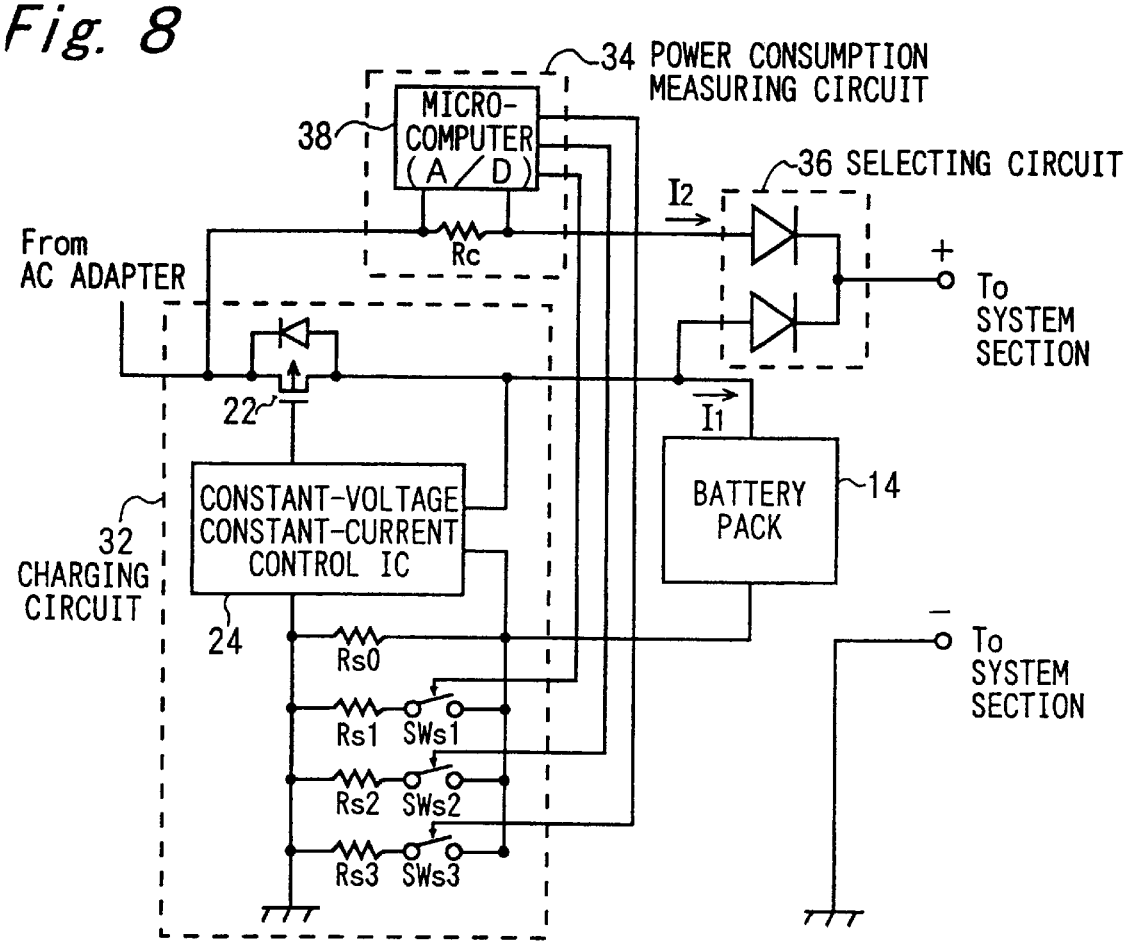
FIG. 8 is a circuit diagram showing an implementation example of the third embodiment.

FIG. 8 is a circuit diagram showing a structural example of the power circuit of the third embodiment. In this example, the charging circuit 32, which serves as a constant voltage source provided with a current limiting function, is constructed of a constant-voltage constant-current power control IC 24 with a model number MM1332E and a p-type MOSFET 22 similar to the example shown in FIG. 2 (a structural example of the charging circuit 12 in the first embodiment). However, a parallel circuit provided by connecting a resistor Rs0, a series circuit of a resistor Rs1 and a switch SWs1, a series circuit of a resistor Rs2 and a switch SWs2, and a series circuit of a resistor Rs3 and a switch SWs3 (the circuit referred to as a "current detecting resistance circuit" hereinafter) is used in place of the current detecting resistor Rs. Then, the power consumption measuring circuit 34 is constructed of a resistor Rc inserted in the power line for supplying a current from the AC adapter 90 to the system section 16 via the selecting circuit 36 and a microcomputer 38 having a built-in A/D converter. The resistance value of the resistor Rc is extremely small (e.g., 0.05 $\Omega$), and the microcomputer 38 generates a digital signal representing the voltage across the resistor Rc by means of its built-in A/D converter. This digital signal can be regarded as an indicator of a current I2 supplied from the AC adapter 90 to the system section 16 (the consumed current at the system section 16). Since the output voltage of the AC adapter has a constant value, the microcomputer 38 measures the power consumption at the system section 16 by means of this digital signal. Then, the microcomputer 38 controls the opening and closing of the switches SWs1 through SWs3 in response to the power consumption measure based on a specified program stored in a built-in memory, thereby varying the resistance value (referred to as a "detection resistance value" hereinafter) of the current detecting resistance circuit in the charging circuit 32. In this stage, the microcomputer 38 controls the opening and closing of the switches SWs1 through SWs3 so that the detection resistance value increases as the power consumption at the system section 16 increases and the detection resistance value decreases as the power consumption decreases. The selecting circuit 36 is implemented by the "matched diodes" (refer to FIG. 10) similar to the prior art, while the battery pack 14 has a construction in which two lithium ion battery cells are connected in series with each other, similar to the prior art and the first and second embodiments. Although no circuit directly corresponding to the current distributing circuit 30 shown in FIG. 7 exists in the example shown in FIG. 8, the function of the current distributing circuit 30 is implemented by the current detecting resistance circuit in the charging circuit 32.

In the notebook computer 10 having the power circuit constructed as above, the voltage supplied from the AC adapter 90 is set to be higher than the voltage (8.4 V) supplied from the charging circuit 32. With this arrangement, when the notebook computer 10 is connected to the power line of the commercial electric power via the AC adapter 90, the commercial electric power externally supplied is supplied to the system section 16 via the selecting circuit 36 and to the battery pack 14 via the charging circuit 32. However, no power is supplied from the battery pack 14 to the system section 16. In this case, the charging circuit 32 is a constant voltage source provided with the current limiting function, and therefore, the charging current I1 supplied to the battery pack 14 does not exceed the current limitation value of the charging circuit 32, and this current limitation value increases as the detection resistance value decreases. It is to be noted that the values of the resistors Rs0 through Rs3 are selected so that the current limitation value does not become greater than 1.5 A in consideration of the charging characteristic of the lithium ion battery which serves as the secondary battery.

The microcomputer 38 detects the current I2 supplied from the AC adapter 90 to the system section 16 by means of the voltage across the resistor Rc and measures the power supplied to the system section 16 according to the detection result. Then, as stated before, it controls the opening and closing of the switches SWs1 through SWs3 so that the detection resistance value increases as the power consumption at the system section 16 increases and the detection resistance value decreases as the power consumption decreases. Therefore, the current limitation of the charging circuit 32 decreases as the power consumption at the system section 16 increases, and the current limitation value increases as the power consumption decreases. With this arrangement, the charging current I1 supplied to the battery pack 14 and the current I2 supplied to the system section 16 (power consumption at the system section 16) have a negative correlation. Accordingly, the total power supplied to the notebook computer via the AC adapter, i.e., the total power consumption in the notebook computer can be suppressed to a value not greater than a specified value regardless of the operating state of the system section 16. This specified value can be a value significantly smaller than the sum of the maximum powers required by the system section 16 and the charging circuit 32 by selecting the values of the resistors Rs0 through Rs3 in the current detecting resistance circuit.

Modification Example

Although the microcomputers 28 and 38 provided with the built-in A/D converter are used as the means for detecting the voltage across both the terminals of the battery pack 14 or the resistor Rc as shown in FIGS. 6 and 8 in the second and third embodiments, it is acceptable to prepare a circuit for generating a signal for controlling the opening and closing of the switches SW1 through SW3 or the switches SWs1 through SWs3 by using a plurality of comparators and a plurality of resistors, or an A/D converter for directly outputting a signal for controlling the opening and closing of the switches by converting the aforementioned voltage into a digital signal and to employ the A/D converter in place of the microcomputers 28 and 38.

What is claimed is:

1. A power circuit for a device having a secondary battery, the power circuit receiving commercial electric power supplied externally and supplying electric power to a target circuit in the device and to the secondary battery, the power circuit comprising:

a charging circuit for receiving commercial electric power supplied externally and operating as a constant voltage source having a current limiting function;

a resistor connected in series with a secondary battery;

a power supply line connecting a circuit, including the secondary battery and said resistor, in parallel with a target circuit in a device for supplying power from said charging circuit to the secondary battery, said resistor, and the target circuit;

a comparator for comparing a voltage of the secondary battery with a threshold voltage; and a switch connected in parallel with the resistor, the switch opening when the voltage of the secondary battery is not higher than a specified voltage and closing when the voltage of the secondary battery is higher than the specified voltage based on a comparison result produced by said comparator.

2. A power circuit for a device having a secondary battery, the power circuit receiving commercial electric power supplied externally and supplying electric power to a target circuit in the device and to the secondary battery, the power circuit comprising:

a charging circuit for receiving commercial electric power supplied externally and operating as a constant voltage source having a current limiting function;

a resistor connected in series with a secondary battery;

a power supply line connecting a circuit, including the secondary battery and said resistor, in parallel with a target circuit in a device for supplying power from said charging circuit to the secondary battery, said resistor, and the target circuit;

a detecting circuit for detecting the voltage of the secondary battery; and a resistance control circuit for varying resistance of said resistor so that the voltage of the secondary battery and the resistance of said resistor have a negative correlation based on a detection result of said detecting circuit.

3. The power circuit as claimed in claim 2, wherein said resistor comprises a plurality of series circuits, each including a resistive element and a switch connected in series with each other, said series circuits being connected in parallel with one another; and said resistance control circuit controls opening and closing of said switches so that the resistance of said resistor and the voltage of the secondary battery have a negative correlation based on a detection result of said detecting circuit.

4. A power circuit for a device having a secondary battery, the power circuit receiving commercial electric power supplied externally and supplying electric power to a target circuit in the device and to the secondary battery, the power circuit comprising:

a measuring circuit for measuring power consumption of a target circuit in a device; and a current control circuit for controlling a charging current to the secondary battery so that the power consumption and the charging current have a negative correlation based on a measurement result of said measuring circuit.

5. The power circuit as claimed in claim 4, further comprising a charging circuit receiving the commercial electric power supplied externally and operating as a constant voltage source having a current limiting function to supply a charging current to the secondary battery, wherein said current control circuit controls said charging circuit so that the power consumption and the charging current have a negative correlation by varying a current limitation of said constant voltage source based on a measurement result of said measuring circuit.

6. The power circuit as claimed in claim 5, wherein said charging circuit includes a current detecting resistor and implements the current limiting function based on a current detected by said current detecting resistor, and said current control circuit varies the current by varying resistance of said current detecting resistor based on the measurement result of said measuring circuit.

7. The power circuit as claimed in claim 6, wherein said current detecting resistor comprises a plurality of series circuits, each including a resistive element and a switch connected in series with each other, said series circuits being connected in parallel with one another; and said current control circuit varies the resistance of said current detecting resistor by controlling the opening and closing of said switches based on the measurement result of said measuring circuit.

* * * * *